United States Patent Office 3,824,194
Patented July 16, 1974

3,824,194
CATALYST FOR USE IN CONVERSION OF GASES AND METHOD FOR PREPARING THEREOF
Yutaka Ushimaru, Hachioji, Koichi Matsuo, Mitaka, and Yukihiro Tochio, Tokyo, Japan, assignors to Mitsui Mining & Smelting Co., Ltd., Tokyo, Japan
Filed Aug. 2, 1972, Ser. No. 277,344
Claims priority, application Japan, Aug. 5, 1971, 46/59,165
Int. Cl. B01j 11/06, 11/32
U.S. Cl. 252—458                               8 Claims

ABSTRACT OF THE DISCLOSURE

A molded catalyst obtained through a process comprising the steps of mixing manganese oxide(s) or a mixture of manganese oxide(s) and metal oxide(s), such as bismuth oxide(s), copper oxide(s), iron oxide(s), zinc oxide, lead oxide(s), alumina, silica and magnesia, with at least one metal powder selected from a group consisting of copper, iron and zinc powder; forming the chromate film onto the surface of said metal powder by dipping the thus prepared mixture in an aqueous solution containing chromic acid; molding the thus treated mixture into a suitable shape; and then subjecting the thus molded product to heat treatment in order to dehydrate said chromate film, is effective in conversion of carbon monoxide, hydrocarbons and nitrogen oxides, particularly in conversion of said gaseous components contained in exhaust emissions from vehicles.

BACKGROUND OF THE INVENTION (a) Field of the Invention

The present invention relates to a catalyst suitable for use in conversion of carbon monoxide or hydrocarbons or a gas containing both of them—particularly, a catalyst for use in conversion of gases which demonstrates an excellent efficiency in the action of catalytically converting the harmful components of exhaust emissions from vehicles, such as carbon monoxide, hydrocarbons, etc. into such harmless components as carbon dioxide, water, etc.

(b) Description of the Prior Art

As catalysts hitherto recognized as effective in conversion of gas components such as carbon monoxide, hydrocarbons, etc., a variety of metals or metal oxides are known. And these catalysts are usually put to use upon artificially providing the optimum working conditions therefor so as to have the maximum of their converting efficiency demonstrated. As for a catalyst intended for purification of the waste gas arising from automobiles, however, the artificial adjustment of said working conditions is impossible.

Therefore, a catalyst to serve for the purification of the waste gas arising from automobiles is required to satisfy such conditions as follows: (1) It must be able to display a high activity in a wide range of temperature covering low temperature and high temperature; (2) it must have such a heat resisting property to withstand the high temperature to which the catalyst bed may often be exposed; (3) it must have a mechanical strength enough to withstand vibrations during the running of the automobile. A catalyst wanting in any of these properties will be disqualified as a satisfactory catalyst for use in purification of exhaust emissions from vehicles.

However, none of the conventional catalysts which have been used in purification of exhaust emissions from vehicles can satisfy all the requirements as above-mentioned. For example, there seems to be such tendencies that those catalysts possessing adequate catalytic activity as the most important property thereof are insufficient in heat resistivity and in mechanical strength, while those catalysts possessing mechanical strength as the most important property thereof are wanting in catalytic activity.

SUMMARY OF THE INVENTION

The object of the present invention is to provide a catalyst for use in conversion of gases having remarkable superiorities in respect to chemical efficiency (i.e., catalytic activity), heat resistivity and mechanical strength, and a method for its preparation.

Another object of the present invention is to provide a catalyst for use in conversion of gases which is durable for a long period, and a method for its preparation.

The present invention relates to a catalyst for use in conversion of gases and a method for preparing it comprising the steps of mixing manganese oxide(s), or a mixture containing manganese oxide(s) as a main catalytic component, with at least one metal powder selected from the group consisting of copper, iron and zinc powder; forming a chromate film onto the surface of said metal powder by dipping the thus prepared mixture into an aqueous solution containing chromic acid; and then molding the thus treated mixture into a suitable shape, followed by a subsequent heat treatment of the molded product.

With reference to the description above and below, it should be noted that the term such as "oxide(s)" denotes a singularity or a plurality of oxide, i.e., "an oxide or oxides."

DETAILED DESCRIPTION OF THE INVENTION

Figure 1:
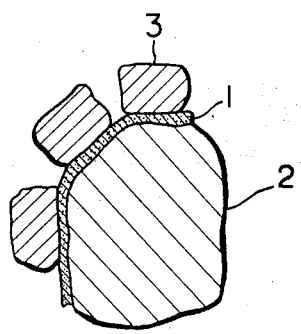
FIG. 1 is a cross-section, on an enlarged scale, of a catalyst obtained by subjecting the mixture of metal oxide and metal powder to chromate treatment.

The manganese oxides applicable to the present invention include $MnO_2$, $Mn_2O_3$, $Mn_3O_4$, etc. which are generally known as being suitable for the catalytic oxidation of such gases as carbon monoxide, etc. As the other oxides to be mixed with said manganese oxide(s), there are, for instance, oxides of bismuth, copper, iron, zinc lead, aluminum, silicon, magnesium, etc., and these oxides are mixed with manganese oxide(s) as the promoter or the carrier as occasion demands. The catalyst according to the present invention is composed of the particles of the foregoing manganese oxide(s), or a mixture of this manganese oxide(s) with said oxide(s) of bismuth or copper, etc. noted above (hereafter these oxides are referred to as catalytic oxides) and at least one member selected from the group consisting of copper powder, iron iron powder, and zinc powder. Application of catalytic oxide(s) alone, as a catalyst for purifying exhaust emissions from vehicles is not suitable, since the exposure thereof to a high temperature results in deterioration of its activity, due to the poor heat resistivity thereof, whereby catalytic action thereof diminishes.

But, once said metal powder is admixed in this catalyst, there is obtained a considerable reduction in the deterioration of catalytic activity thereof even when exposed to a high temperature for a long period. Said catalyst containing said metal powder, however, is still insufficient in respect to mechanical strength.

The inventors of the present invention have discovered a satisfactory solution to the disadvantage of the insufficient mechanical strength of said catalyst by forming a chromate film onto the surface of said metal powder contained therein. In other words, the metals employed in the present invention, namely, copper, iron and zinc can easily be subjected to chromate-treatment, and the chromate film thus formed on the powder of these metals functions as the binder.

To give a further elucidation of the present invention, although the principal catalytic component of the catalyst under the present invention is manganese oxide(s), addition thereto of other metal oxide(s) to work as a promoter or a carrier as described above will cause no obstacle at all; it is rather desirable as there are frequent occasions when such addition tends to enhance the catalytic activity. The ratio of manganese oxide(s) to be contained in a catalytic oxide is usually more than 20% by weight. As to the metal powder to be added to make the catalyst heat-resistant, it will do to employ either one member or more from said group consisting of copper, iron and zinc powder; and, to produce a catalyst of excellent properties, it is the most important to let said metal powders(s) disperse uniformly in the catalytic oxide. Therefore, the particle size of said metal powder(s) should preferably be less than 150$\mu$ and the quantity thereof should be about 0.1 to 50% by weight of the whole of the catalytic oxide. In case the quantity is less than 0.1% by weight, sufficient heat resistivity and mechanical strength cannot be realized, while in case it is more than 50% by weight, the relative quantity of the catalytic components in the catalyst decreases, rendering it difficult to effect the purification of the waste gas satisfactorily. From the viewpoint of uniform dispersion and economical use of the metal powder(s), it is appropriate to apply it in amounts of about 0.2 to 20% by weight in ordinary cases.

Figure 2:
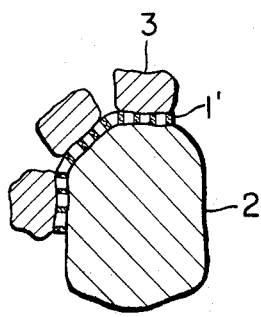
FIG. 2 is a same cross-section, as shown in FIG. 1, after the catalyst has been subjected to heat treatment so as to skeletonize the chromate film thereof.

Addition of metal powder(s) may be performed either through such a very common process as simply adding the metal powder(s) to the catalytic oxide to mix them together, or through a specific process, such as a process wherein the metal(s), such as iron, copper and zinc, is deposited onto the surface of catalytic oxide through the ordinary procedures for non-electrolytic plating applicable to non-conductive substances such as plastics. The chromate-treatment is conducted by dipping the foregoing mixture in an aqueous solution containing chromic acid. As the conditions for this treatment, the concentration of chromic anhydride to be applied is in the range of 1 to 300 g./l.—preferably 50 to 150 g./l., and the temperature of the aqueous solution suffices to be room temperature. The dipping time varies more or less with the concentration, temperature, etc. of the aqueous solution of chromic acid, and a suitable time is roughly in the range of 30 to 5 minutes. Through this treatment, the powder of such metal(s) as iron, copper and zinc, react with chromic acid to form the chromate film on the surface of said metal powder. It seems that this chromate film (1) sticks firmly onto the surface of the metal powder (2) and also firmly adheres to the surfaces of the particles of catalytic oxide (3) (see FIG. 1). Therefore, when the mixture thus subjected to chromate-treatment is molded into a desired shape upon adjustment of the water content thereof to be convenient for molding, the chromate film works as a strong binder. Subsequently, through dehydration of this chromate film by means of heat treatment, a catalyst of the present invention featured with an exceedingly improved mechanical strength can be obtained. The heat treatment in the present invention is conducted by heating the molded catalyst(s) at a temperature in the range of 500 to 1200° C., preferably 600 to 900° C., usually for about 3 to 1 hours, and then cooling them in air. This heat treatment has an additional effect. That is, when the chromate film is heated, it begins to crack with the start of the dehydration reaction at a temperature of about 100° C., and these cracks increase in number and dimension as the temperature rises until the chromate film has been completely dehydrated at about 500° C., leaving the skeleton-like chromium oxide (1') as shown in FIG. 2. This porous structure seems to have a favorable effect on the catalytic activity.

As will be understood from the foregoing, the catalyst according to the present invention has superb heat resistivity as well as mechanical strength and is capable of retaining for a long period the efficiency for making the hazardous carbon monoxide and hydrocarbons harmless even under such severe conditions as in the case of purification of exhaust emissions from vehicles. Therefore, it can be extensively utilized industrially as the practical catalyst for use in purification of exhaust emissions.

DESCRIPTION OF THE PREFERRED EMBODIMENTS

In the following will be given examples of the embodiment of the present invention.

EXAMPLE 1

A mixture prepared by mixing 50 wt. percent of manganese (III) oxide, 10 wt. percent of cupric oxide, 10 wt. percent of ferric oxide, 20 wt. percent of $\gamma$-alumina and 10 wt. percent of copper powder was dipped in an aqueous solution containing 100 g./l. of chromic anhydride for 30 minutes at room temperature, dried thereafter, and subjected to compacting employing a pressure of 1000 kg./cm.$^2$ succeeded by heat treatment at 600° C. for an hour, whereby a catalyst according to the present invention was obtained. This catalyst was possessed of a superb mechanical strength of compression strength of 1000 kg./cm.$^2$. Meanwhile, as the sample for the purpose of comparison (hereinafter called comparative sample for short), another catalyst was prepared by subjecting a mixture composed of 50 wt. percent of manganese sesquioxide, 10 wt. percent of cupric oxide, 10 wt. percent of ferric oxide and 30 wt. percent of alumina cement to compacting employing the pressure of 1000 kg./cm.$^2$. The compression strength of this comparative sample was no more than 200 kg./cm.$^2$. When the initial catalytic activity and the catalytic activity after 2 hours' heating at 1000° C. of both catalysts were measured to evaluate the heat resistivities thereof, the degree of deterioration of the catalyst under the present invention proved very low as compared with the remarkable deterioration of the comparative sample as shown in Table 1 below.

TABLE 1.—CARBON MONOXIDE CONVERSION RATIO

| Temperature of catalyst layer, ° C. | Initial stage, percent | | After 2 hours heating at 1,000° C., percent | |
|---|---|---|---|---|
| | Comparative sample | Catalyst under present invention | Comparative sample | Catalyst under present invention |
| 200 | 22 | 50 | 0 | 10 |
| 300 | 63 | 72 | 0 | 45 |
| 400 | 90 | 95 | 0 | 73 |
| 500 | 95 | 99 | 0 | 80 |

Remarks: Composition of gas; CO 2%, O$_2$ 3%, N$_2$ balance (vol. percent). Time of contact between gas and catalyst: 0.2 second.

EXAMPLE 2

Referring to the kinds of catalysts according to the present invention shown in the following Table 2, the catalysts No. 1 and No. 2 are composed of the catalytic oxide described in the table along with one or two members selected from the group of copper, iron and zinc powder, while the catalysts No. 3 and No. 4 are composed of the catalytic oxide, described in the table, plated with copper or zinc respectively by means of nonelectrolytic plating. These mixtures were respectively dipped in an aqueous solution containing chromic anhydride by 100 g./l. in concentration for 30 minutes at the room temperature, dried thereafter, and subjected to compacting employing the pressure of 1000 kg./cm.$^2$ to be succeeded by heat treatment at 700° C. for 2 hours, whereby various catalysts shown in Table 2 were prepared.

No. 1 to No. 4 of the comparative samples are catalysts corresponding to No. 1 to No. 4 of the catalysts under the present invention, prepared by molding only the catalytic oxide of the corresponding catalysts under the present invention, without any admixing of metal powders and any chromate-treatment.

As is clear from Table 2, the strength of the catalyst under the present invention was improved by 4 to 5 times in relation to that of the corresponding comparative sample, and, as for the conversion efficiency for carbon monoxide (CO), hydrocarbons (HC) and nitrogen oxides (NOx) contained in exhaust emissions, it showed a high conversion ratio of CO and HC even after exposure to a high temperature during the continuous run for as long as 200 hours. Further, it demonstrated such superior catalytic properties as being capable of converting NOx too.

thereof at least one free metal selected from the group consisting of copper, iron and zinc, said free metal having a porous dehydrated chromate film on the surface thereof formed by reaction of aqueous solution of chromic acid with said free metal followed by dehydration, said film firmly adhering to and bonding together said metal oxide particles and said free metal, said metal particles containing at least 20 percent by weight of manganese oxide or oxides, said metal particles being present in an amount of from 0.1 to 50 percent by weight, based on the weight of said metal oxide particles.

3. A catalyst according to Claim 1, wherein component (A) is manganese oxide mixed with at least one metal oxide selected from the group consisting of copper oxides,

TABLE 2.—COMPARATIVE EFFICIENCIES OF CATALYSTS

| | Comparative sample | | | | Catalyst under present invention | | | |
| --- | --- | --- | --- | --- | --- | --- | --- | --- |
| | | Compression strength, kg./cm.$^2$ | Gas conversion ratio, percent | | | Compression strength, kg./cm.$^2$ | Gas conversion ratio, percent | |
| Number | Kind of catalyst | | CO | HC | NOx | Kind of catalyst | | CO | HC | NOx |
| 1 | Compacted catalyst wherein Mn$_2$O$_3$: CuO:Fe$_2$O$_3$: Al$_2$O$_3$=50:10: 10:30. | 205 | 85 (50) | 68 (46) | 15 (5) | Catalyst prepared by adding 10 parts of Fe powder to 100 parts of comparative sample composition, subjecting the mixture to chromate-treatment and then compacting thus treated mixture to be succeeded by 1 hour's heat treatment at 700° C. | 963 | 92 (80) | 80 (75) | 75 (60) |
| 2 | Compacted catalyst wherein Mn$_2$O$_3$: CuO:ZnO: Al$_2$O$_3$= 40:10:10:40. | 230 | 77 (58) | 70 (55) | 18 (5) | Catalyst prepared by adding 10 parts of Cu powder and 10 parts of Zn dust to 100 parts of comparative sample composition, subjecting the mixture to chromate treatment and then compacting thus treated mixture to be succeeded by 2 hours' heat treatment at 600° C. | 1,105 | 85 (71) | 82 (73) | 70 (60) |
| 3 | Compacted catalyst, wherein MnO$_2$: Bi$_2$O$_3$:Al$_2$O$_3$= 50:20:30. | 185 | 83 (52) | 75 (60) | 17 (10) | Catalyst prepared by plating comparative sample composition with Zn (by 0.5 wt. percent), subjecting it to chromate-treatment and then compacting thus treated mixture to be succeeded by 2 hours' heat treatment at 700° C. | 908 | 88 (76) | 78 (73) | 64 (58) |
| 4 | Compacted catalyst, wherein Mn$_2$O$_3$: CuO:Fe$_2$O$_3$: Al$_2$O$_3$:MgO= 50:10:10:25:5. | 212 | 82 (55) | 73 (56) | 22 (10) | Catalyst prepared by plating comparative sample composition with Cu (by 1 wt. percent), subjecting it to chromate-treatment and then compacting thus treated mixture to be succeeded by 1 hours' heat treatment at 600° C. | 868 | 93 (83) | 81 (77) | 74 (65) |

Remarks:
1. Composition of gas applied.—Waste gas arising from 1,600 cc. automobile engine: CO, 19 g./mile; HC, 1.3 g./mile; NOx 2.5 g./mile.
2. The figure in the column "Gas conversion ratio" represents the value at the initial stage; the bracketed figure in the same column represents the value after 200 hours' service.
3. HC in remark 1 represents the value in terms of n-hexane.

What is claimed is:

1. A catalyst composition consisting essentially of (A) metal oxide particles, having uniformly dispersed therein, (B) particles of at least one free metal selected from the group consisting of copper, iron and zinc, said free metal particles having a size of less than 150μ, said free metal particles having a porous dehydrated chromate film on the surface thereof formed by reaction of aqueous solution of chromic acid with said free metal particles followed by dehydration, said film firmly adhering to and bonding together said metal oxide particles and said free metal particles;

said metal oxide particles containing at least 20 percent by weight of manganese oxide or oxides, said metal particles being present in an amount of from 0.1 to 50 percent by weight, based on the weight of said metal oxide particles.

2. A catalyst composition consisting essentially of metal oxide particles having deposited on the surfaces iron oxides, lead oxides, zinc oxide, bismuth oxides, alumina, silica and magnesia.

4. A catalyst according to Claim 2, wherein component (A) is manganese oxide mixed with at least one metal oxide selected from the group consisting of copper oxides, iron oxides, lead oxides, zinc oxide, bismuth oxides, alumina, silica and magnesia.

5. A catalyst composition according to Claim 1, prepared by reacting the mixture of component (A) and component (B) with aqueous solution of chromic acid to form chromate film on component (B), molding the mixture under pressure to form molded catalyst elements and then heat treating said molded catalyst elements to convert the chromate film to a porous chromium oxide layer.

6. A catalyst composition according to Claim 5, in which the heat treating comprises heating the molded catalyst elements at a temperature of 500 to 1200° C., for from 1 to 3 hours.

7. A catalyst composition according to Claim 2, prepared by reacting component (A) having component (B) deposited on the surface thereof, with aqueous solution of chromic acid to form chromate film on component (B), molding the mixture under pressure to form molded catalyst elements and then heat treating said molded catalyst elements to convert the chromate film to a porous chromium oxide layer.

8. A catalyst composition according to Claim 7, in which the heat treating comprises heating the molded catalyst elements at a temperature of 500 to 1200° C., for from 1 to 3 hours.

References Cited
UNITED STATES PATENTS

| | | | |
|---|---|---|---|
| 2,653,322 | 10/1953 | Eberle | 252—468 X |
| 3,452,106 | 6/1969 | Sato et al. | 252—467 X |
| 1,900,829 | 3/1933 | Lusby | 252—471 X |

CARL F. DEES, Primary Examiner

U.S. Cl. X.R.

252—465, 467, 471